United States Patent
Fukata et al.

(10) Patent No.: US 9,833,845 B2
(45) Date of Patent: Dec. 5, 2017

(54) END MILL WITH COOLANT HOLES

(71) Applicant: MITSUBISHI MATERIALS CORPORATION, Tokyo (JP)

(72) Inventors: Koji Fukata, Akashi (JP); Takayuki Azegami, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 103 days.

(21) Appl. No.: 14/436,001

(22) PCT Filed: Oct. 21, 2013

(86) PCT No.: PCT/JP2013/078436
§ 371 (c)(1),
(2) Date: Apr. 15, 2015

(87) PCT Pub. No.: WO2014/069265
PCT Pub. Date: May 8, 2014

(65) Prior Publication Data
US 2015/0266113 A1    Sep. 24, 2015

(30) Foreign Application Priority Data
Oct. 29, 2012   (JP) ................................. 2012-237853

(51) Int. Cl.
B23C 5/28    (2006.01)
B23C 5/10    (2006.01)

(52) U.S. Cl.
CPC .................. B23C 5/28 (2013.01); B23C 5/10 (2013.01); *B23C 2210/202* (2013.01);
(Continued)

(58) Field of Classification Search
CPC . B23C 2210/246; B23C 2250/12; B23C 5/28; B23C 5/10; B23C 5/1081
See application file for complete search history.

(56) References Cited

U.S. PATENT DOCUMENTS

| 2013/0078044 A1* | 3/2013 | Sharivker | ................. B23C 5/10 407/54 |
| 2015/0037105 A1* | 2/2015 | Fukata | ..................... B23C 5/28 407/11 |
| 2016/0082526 A1* | 3/2016 | Swift | ....................... B23C 5/28 407/11 |

FOREIGN PATENT DOCUMENTS

| DE | 202009014216 U | 2/2010 |
| JP | 3025383 U | 6/1996 |

(Continued)

OTHER PUBLICATIONS

International Search Report dated Dec. 17, 2013 for the corresponding PCT Application No. PCT/JP2013/078436.
(Continued)

Primary Examiner — Sara Addisu
(74) Attorney, Agent, or Firm — Leason Ellis LLP

(57) ABSTRACT

An end mill body comprises: bottom blades formed at ridgelines where gashes and tip flank faces intersect, the gashes are formed at the tips of chip discharge grooves. At least one of the bottom blades serves as a long bottom blade that extends toward an inner peripheral side longer than the remaining bottom blades. The end mill body also has coolant holes formed between the chip discharge grooves. A coolant hole which is located between a chip discharge groove of a gash and a chip discharge groove located behind the chip discharge groove in a rotational direction is open to the tip clearance face of the long bottom blade. A coolant hole which is located between the chip discharge groove of the gash and a chip discharge groove located in front of the chip discharge groove in the rotational direction is open to the gash of the long bottom blade.

13 Claims, 5 Drawing Sheets

(52) U.S. Cl.
CPC .. *B23C 2210/246* (2013.01); *B23C 2210/285* (2013.01); *B23C 2250/12* (2013.01); *Y10T 407/14* (2015.01)

(56) References Cited

FOREIGN PATENT DOCUMENTS

| | | | | |
|---|---|---|---|---|
| JP | 08-290319 | A | | 11/1996 |
| JP | 11216609 | A * | 8/1999 | .............. B23C 5/10 |
| JP | 2001-025915 | A | | 1/2001 |
| JP | 2003-505259 | A | | 2/2003 |
| JP | 2003-340626 | A | | 12/2003 |
| JP | 2004-276142 | A | | 10/2004 |
| JP | 2004276142 | A * | 10/2004 | |
| JP | 2005-502484 | A | | 1/2005 |
| JP | 2005125433 | A * | 5/2005 | |
| JP | 2005125465 | A * | 5/2005 | |
| JP | 2006-239829 | A | | 9/2006 |
| JP | 2007-313632 | A | | 12/2007 |
| JP | 4409665 | B | | 2/2010 |
| JP | 2010-214545 | A | | 9/2010 |
| WO | WO-01/07189 | A | | 2/2001 |
| WO | WO-03/024661 | A | | 3/2003 |

OTHER PUBLICATIONS

European Search Report dated Jun. 10, 2016 for the corresponding European Application No. 13850824.7.

* cited by examiner

END MILL WITH COOLANT HOLES

CROSS-REFERENCE TO RELATED PATENT APPLICATIONS

This application is a U.S. National Phase Application under 35 U.S.C. §371 of International Patent Application No. PCT/JP2013/078436, filed Oct. 21, 2013, and claims the benefit of Japanese Patent Application No. 2012-237853, filed on Oct. 29, 2012, all of which are incorporated by reference in their entirety herein. The International Application was published in Japanese on May 8, 2014 as International Publication No. WO/2014/069265 under PCT Article 21(2).

FIELD OF THE INVENTION

The present invention relates to an end mill with coolant holes in which a tip portion of an end mill body is formed with a plurality of bottom blades, and a plurality of coolant holes are formed within the end mill body and are made open to the tip portion.

BACKGROUND OF THE INVENTION

As an end mill with coolant holes equipped with such a plurality of bottom blades and such a plurality of coolant holes, for example, Japanese Registered Utility Model No. 3025383 suggests the following four-bladed ball end mill. In this end mill, coolant holes (fluid supply holes) are made open to tip flank faces of two bottom blades among four bottom blades (tip cutting blades) of the ball end mill, whereas in order to equally supply the coolant (fluid) to all the bottom blades, the bottom blades are formed at the tip portion along three or four chip discharge grooves (helical gashes), and number of coolant holes equal to that of the chip discharge grooves are respectively made open to the tip flank faces of the bottom blades.

Additionally, Japanese Patent No. 4409665 also described an end mill with coolant holes and four unequal bottom blades. The end mill has a pair of long bottom blades provided up to the vicinity of an axial center along a pair of first gashes symmetrically formed with respect to the axial center, and a pair of short bottom blades provided along second gashes formed so as to reach the first gashes from an outer peripheral portion symmetrically with respect to the axial center at the positions of 90° from the pair of long bottom blades around the axial center. The end mill also has fluid supply holes (coolant holes) which have a pair of openings that are open to flank faces of the pair of long bottom blades and which are provided to longitudinally pass through the end mill, and a pair of communication grooves provided so as to increase the communication area of the first gashes and the second gashes where ends on the side of the axial center intersect each other and so as to connect intersecting portions between the first gashes and the second gashes and openings of the coolant holes.

Technical Problem

Incidentally, in a case where the long bottom blades and the short bottom blades are formed at the tip portion of the end mill body as the bottom blades particularly as described in Japanese Patent No. 4409665, for example during longitudinal-feed processing or ramping processing of performing cutting processing by feeding the end mill body also to a tip side, the amount of chips produced by the long bottom blades is increased and chip discharge performance is impaired. Therefore, chip clogging is easily caused. Therefore, it becomes difficult to secure excellent chip discharge performance using the long bottom blades merely by making a number of coolant holes equal to that of the bottom blades be open to the tip flank faces of the bottom blades as described in Japanese Registered Utility Model No. 3025383 or merely by providing the communication grooves so as to connect the intersecting portions between the first gashes and the second gashes and the openings of the coolant holes as described in Japanese Patent No. 4409665.

Additionally, there is also a concern that the flank face wear of the long bottom blades may be promoted and shortening of service life may be caused as the amount of chips produced by the long bottom blade is increased in this way and a burden to the long bottom blades also becomes large. In the end mill in which the communication grooves are formed particularly as described in Japanese Patent No. 4409665, the amount of a coolant supplied to the tip flank faces of the long bottom blades from the coolant holes decreases. Therefore, it becomes difficult to reliably minimize the flank face wear of the long bottom blades.

The invention has been made under such a background, and an object thereof is to provide an end mill with coolant holes capable of smoothly discharging chips produced by a long bottom blade particularly during longitudinal feed processing or ramping processing while effectively minimizing flank face wear of the long bottom blade, in the end mill in which a cutting blade part at a tip of an end mill body is formed with the long bottom blade extending to an inner peripheral side of the end mill body longer than the other bottom blades.

SUMMARY OF THE INVENTION

Technical Solution

In order to solve the above problems and achieve such an object, the invention provides an end mill with coolant holes. Here, a tip portion of an end mill body rotated around an axis serves as a cutting blade part. A plurality of chip discharge grooves twisted to a backward side in a rotational direction of the end mill toward a rear end side in a direction of the axis are formed at predetermined intervals in a circumferential direction at an outer periphery of the cutting blade part. Peripheral blades are respectively formed at outer-peripheral-side ridge portions of wall faces of the chip discharge grooves that face the rotational direction of the end mill, and gashes are formed at tip portions of the chip discharge grooves. Bottom blades extending from tips of the peripheral blades to an inner peripheral side of the end mill body are respectively formed at intersecting ridgeline portions between wall faces of the gashes that face the rotational direction of the end mill and tip flank faces of the end mill body. At least one bottom blade among the bottom blades serves as a long bottom blade extending to the inner peripheral side of the end mill body longer than the other two bottom blades adjacent to a forward side in the rotational direction of the end mill and the backward side in the rotational direction of the end mill. Coolant holes are respectively formed between the chip discharge grooves adjacent to each other in the circumferential direction within the end mill body. A coolant hole among the coolant holes, which passes through a portion between a chip discharge groove connected to a gash along which the long bottom blade is formed and a chip discharge groove adjacent to a backward side of the chip discharge groove in the rotational direction of the end mill, is made open to a tip flank face connected to a backward side of the long bottom blade in the rotational direction of the end mill. A coolant hole, which passes through a portion between the chip discharge groove connected to the gash along which the long bottom blade is formed, and a chip discharge groove adjacent to a forward side of the chip discharge groove in the rotational direction of the end mill, is made open to the gash along which the long bottom blade is formed.

In the end mill with coolant holes configured in this way, the coolant hole, which passes through a portion between the chip discharge groove connected to the gash along which the long bottom blade is formed, and the chip discharge grooves adjacent to the backward side in the rotational direction of the end mill, is made open to the tip flank face connected to the backward side of the long bottom blade in the rotational direction of the end mill. Thus, the flank face wear can be effectively minimized by reliably supplying a coolant to the tip flank face of the long bottom blade so as to cool and lubricate the tip flank face.

Meanwhile, the coolant hole, which passes through a portion between the chip discharge groove connected to the gash along which the long bottom blade is formed, and the chip discharge groove adjacent to the forward side in the rotational direction of the end mill side, is made open to the gash itself along which the long bottom blade is formed. Thus, it is possible to reliably and smoothly discharge a large amount of chips, which are produced by the long bottom blade particularly during longitudinal-feed processing or ramping processing, using the coolant supplied from the coolant hole that is open to the gash. Of course, excellent chip discharge performance can also be obtained even in normal groove processing or normal shoulder shaving processing that feeds the end mill body in a direction perpendicular to the axis.

Here, in order to more effectively minimize the wear of the tip flank face connected to the long bottom blade, in the tip view in the direction of the axis, it is desirable to make an interval between the coolant hole that is made open to the tip flank face connected to the backward side of the long bottom blade in the rotational direction of the end mill, and the long bottom blade smaller than an interval between the bottom blade adjacent to the coolant hole that is made open to the gash along which the long bottom blade is formed, and the bottom blade adjacent to the forward side of the bottom blade in the rotational direction of the end mill so that the coolant hole that is open to the tip flank face of the long bottom blade is formed at a position closer to the long bottom blade.

Additionally, the coolant hole that is made open to the gash along which the long bottom blade is formed may be made open to the gash of the long bottom blade in its entirety, or may be made open astride the gash along which the long bottom blade is formed and the tip flank face of the bottom blade adjacent to the forward side of the long bottom blade in the rotational direction of the end mill, that is, may be made partially open to the tip flank face adjacent to the forward side of the gash of the long bottom blade in the rotational direction of the end mill. However, in the latter case, in order to more reliably and smoothly discharge the chips produced by the long bottom blade, in the tip view in the direction of the axis, it is desirable to make an opening area in the gash along which the long bottom blade is made larger than an opening area in the tip flank face of the bottom blade adjacent to the forward side of the long bottom blade in the rotational direction of the end mill so that the amount of supply of the coolant to the gash of the long bottom blade is increased.

Meanwhile, the coolant hole, which is made open to the tip flank face connected to the backward side of the long bottom blade in the rotational direction of the end mill, passes through substantially the center in the circumferential direction of the end mill body between the chip discharge groove connected to the gash along which the long bottom blade is formed, and the chip discharge groove adjacent to the backward side of the chip discharge groove in the rotational direction of the end mill, in the vicinity of an opening of the tip of the end mill body. However, the coolant hole, which is open to the gash along which the long bottom blade is formed, passes through the vicinity of the chip discharge groove connected to the gash along which the long bottom blade is formed, between the chip discharge groove connected to the gash along which the long bottom blade is formed, and the chip discharge groove adjacent to the forward side of the chip discharge side in the rotational direction of the end mill, similar in the vicinity of the opening of the tip of the end mill body.

For this reason, if the coolant hole, which is open to the gash along which the long bottom blade is formed, is twisted to the backward side in the rotational direction of the end mill toward the rear end side in the direction of the axis, with a lead equal to the lead of the peripheral blade connected to the bottom blade adjacent to the forward side of the long bottom blade in the rotational direction of the end mill as in general end mills, there is a concern that the thickness of the end mill body between the coolant hole and the chip discharge groove connected to the gash along which the long bottom blade may be formed and the strength may be reduced. Particularly on the rear end side of the cutting blade part along which the chip discharge groove separated from the bottom blade is cut upward, there is a concern that, when an excessive load has acted during cutting, the end mill body may be broken.

Thus, in order to prevent the strength reduction of such an end mill body, it is preferable to make the lead of the coolant hole that is made open to the tip flank face connected to the backward side of the long bottom blade in the rotational direction of the end mill, and the lead of a peripheral blade connected to the long bottom blade equal to each other, and to make the lead of the coolant hole that is made open to the gash along which the long bottom blade is made larger than the lead of a peripheral blade connected to the bottom blade adjacent to the forward side of the long bottom blade in the rotational direction of the end mill.

Accordingly, sufficient thickness can be secured between the coolant hole that is open to the tip flank face of the long bottom blade, and the chip discharge groove connected to the gash along which the long bottom blade is formed. Meanwhile, since the thickness between the coolant hole that is open to the gash of the long bottom blade and the chip discharge groove connected to the gash of the long bottom blade becomes gradually larger toward the rear end side of the end mill body, the strength of the end mill body on the rear end side of the cutting blade part can be improved.

In addition, when the strength of the end mill body is improved in this way, the lead of the coolant hole that is made open to the tip flank face connected to the backward side of the long bottom blade in the rotational direction of the end mill, and the lead of a peripheral blade connected to the long bottom blade is made equal to each other, and the lead of the coolant hole that is made open to the gash along which the long bottom blade is made larger than the lead of a peripheral blade connected to the bottom blade adjacent to the forward side of the long bottom blade in the rotational direction of the end mill, so that these peripheral blades can be made to have unequal leads. Thus, generation of chattering vibration can be prevented by canceling the vibration when these peripheral blades bite a workpiece material.

In addition, the invention can be applied to end mills in which a cutting blade part is formed with a plurality of chip discharge grooves, and peripheral blades, gashes, and bottom blades are also formed in the same numbers as that of the chip discharge grooves, that is, end mills except a one-bladed end mill. Particularly, it is preferable to apply the invention to a three-bladed end mill in which one bottom blade is a long bottom blade and extends to an inner peripheral side than the other two bottom blades adjacent thereto, that is, to the end mill with coolant holes in which the cutting blade part is formed with the three chip discharge grooves, the three peripheral blades, the three gashes, and the three bottom blades.

Advantageous Effects

As described above, according to the invention, in the end mill in which the cutting blade part of the tip of the end mill body is formed with the long bottom blade, it is possible to smoothly discharge a large amount of chips produced during longitudinal feed processing or ramping processing while effectively minimizing the flank face wear of the long bottom blade, and it is possible to achieve stable cutting processing for a prolonged period of time.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

EXPLANATION OF REFERENCE

Figure 1:
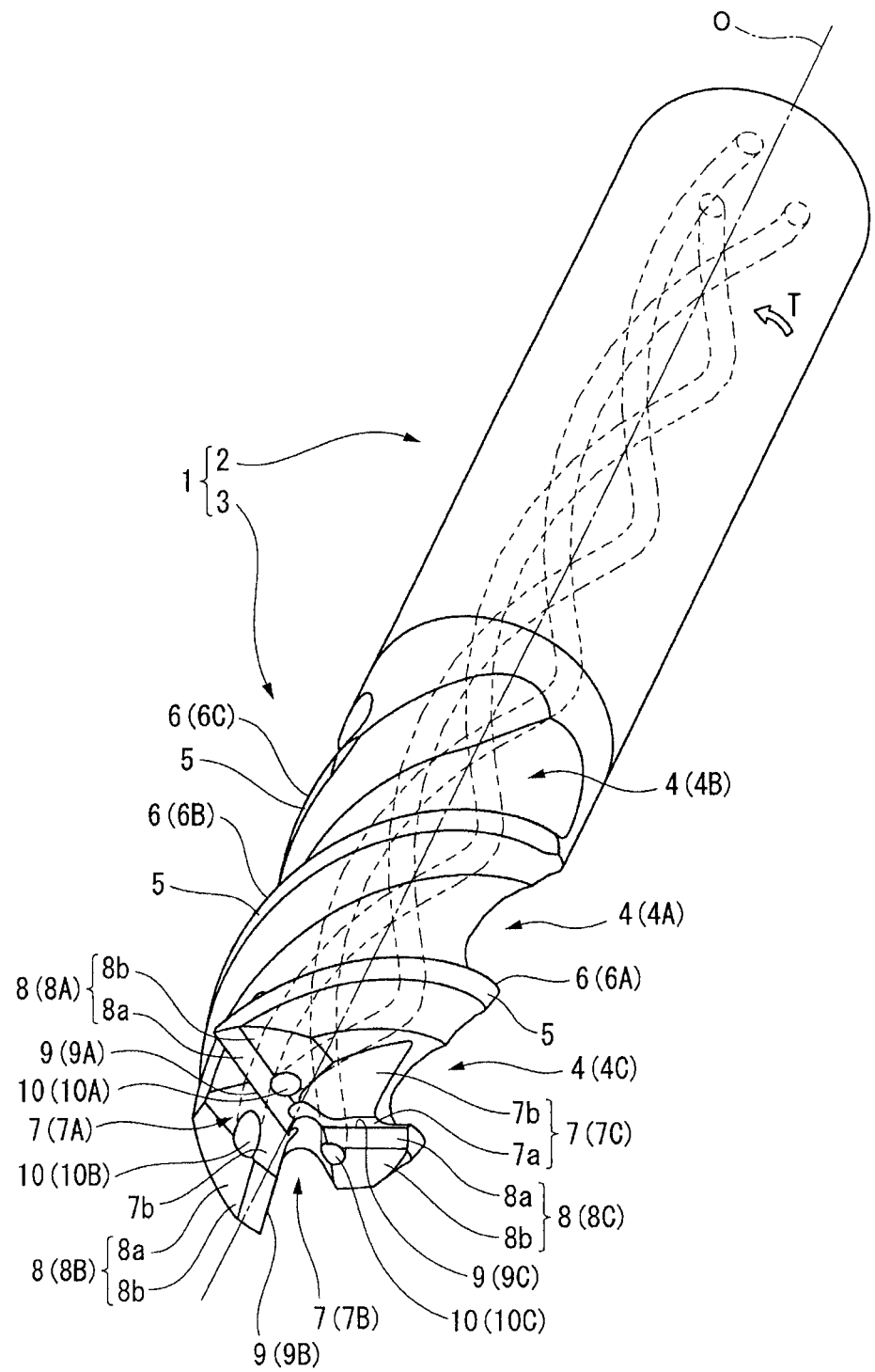
FIG. 1 is a perspective view illustrating an embodiment of the invention.

1: END MILL BODY
2: SHANK PART
3: CUTTING BLADE PART
4: CHIP DISCHARGE GROOVE
4A to 4C: FIRST TO THIRD CHIP DISCHARGE GROOVE
4*a*: WALL FACE OF CHIP DISCHARGE GROOVE 4 THAT FACES FORWARD SIDE IN ROTATIONAL DIRECTION T OF END MILL
4*b*: WALL FACE OF CHIP DISCHARGE GROOVE 4 THAT FACES BACKWARD SIDE IN ROTATIONAL DIRECTION T OF END MILL
5: PERIPHERAL FLANK FACE
6: PERIPHERAL BLADE
6A to 6C: FIRST TO THIRD PERIPHERAL BLADES
7: GASH
7A to 7C: FIRST TO THIRD GASHES
8: TIP FLANK FACE
8A to 8C: FIRST TO THIRD TIP FLANK FACE
8*a*: FIRST FLANK FACE OF TIP FLANK FACE 8
8*b*: SECOND FLANK FACE OF TIP FLANK FACE 8
9: BOTTOM BLADE
9A: FIRST BOTTOM BLADE (LONG BOTTOM BLADE)
9B: SECOND BOTTOM BLADE (SHORT BOTTOM BLADE)
9C: THIRD BOTTOM BLADE (MIDDLE BOTTOM BLADE)
10: COOLANT HOLE
10A to 10C: FIRST TO THIRD COOLANT HOLES
O: AXIS OF END MILL BODY 1
T: ROTATIONAL DIRECTION OF END MILL
t: THICKNESS BETWEEN COOLANT HOLES 10 OF CUTTING BLADE PART 3 ON REAR END SIDE AND WALL FACES 4A AND 4B OF CHIP DISCHARGE GROOVE 4

DETAILED DESCRIPTION OF THE INVENTION

Best Modes for Carrying Out the Invention

FIGS. 1 to 5 illustrate an embodiment of the invention. In the present embodiment, the end mill body 1 is formed in a substantially columnar shape having an axis O as a center, from a hard material, such as cemented carbide, a rear end portion (an upper right portion in FIG. 1 and a right portion in FIGS. 3 and 4) of the end mill body 1 serves as a shank part 2 in the columnar state, and a tip portion (a lower left portion in FIG. 1 and a left portion in 3 and 4) serves as a cutting blade part 3. In such an end mill, the shank part 2 is gripped by spindle of a machine tool and is fed in a direction intersecting the axis O while being rotated in a rotational direction T of the end mill around the axis O whereby groove processing or shoulder shaving processing of a workpiece material, such as a metallic material, is performed by the cutting blade part 3, or the shank part 2 is also delivered in the direction of the axis O whereby vertical shaving processing or ramping processing is performed.

The plurality of chip discharge grooves 4, which are twisted to a backward side in the rotational direction T of the end mill toward a rear end side, are open to a tip of the cutting blade part 3, that is, a tip of the end mill body 1, and are formed at predetermined intervals in the circumferential direction at an outer periphery of the cutting blade part 3. In the present embodiment, three chip discharge grooves, namely, first to third chip discharge grooves 4A to 4C are formed in order toward the rotational direction T of the end mill.

Outer-peripheral-side ridge portions of wall faces 4*a* of the chip discharge grooves 4 that face the rotational direction T of the end mill, that is, intersecting ridgeline portions between the wall faces 4*a* and peripheral flank faces 5 that face an outer peripheral side of the cutting blade part 3 are respectively formed with peripheral blades 6 that have the wall faces 4*a* as rake faces. Therefore, in the present embodiment, three first to third peripheral blades 6A to 6C are formed in order toward the rotational direction T of the end mill, and the first to third peripheral blades 6A to 6C are respectively twisted to the backward side in the rotational direction T of the end mill toward the rear end side of the end mill body 1 with a lead equal to the first to third chip discharge grooves 4A to 4C. In addition, rotation tracks of these peripheral blades 6 around the axis O, become a cylindrical surface shape where its center axis is the axis O.

Figure 3:
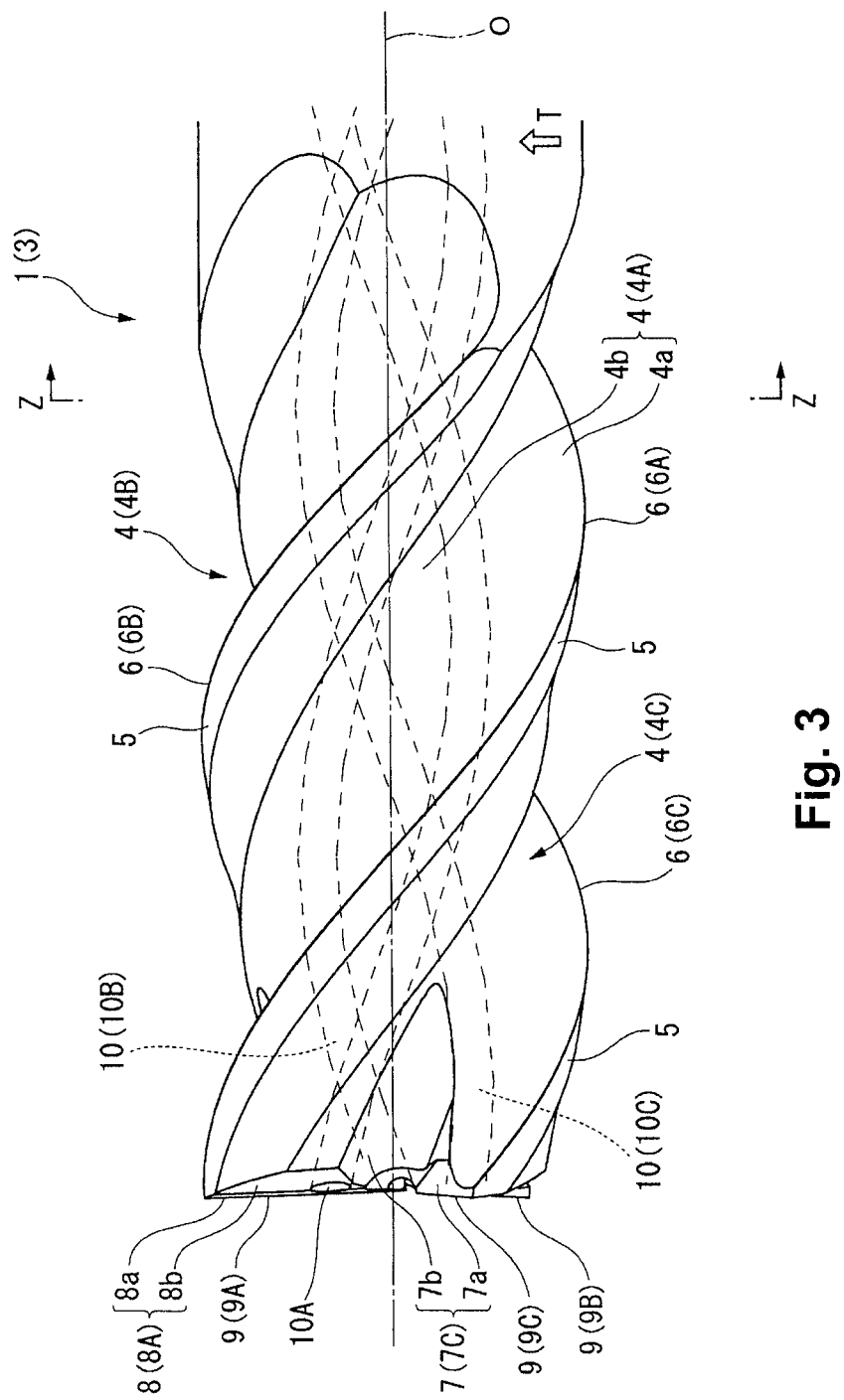
FIG. 3 is an enlarged side view as seen in the direction of arrow X in FIG. 2 of a cutting blade part of the embodiment illustrated in FIG. 1.
Figure 4:
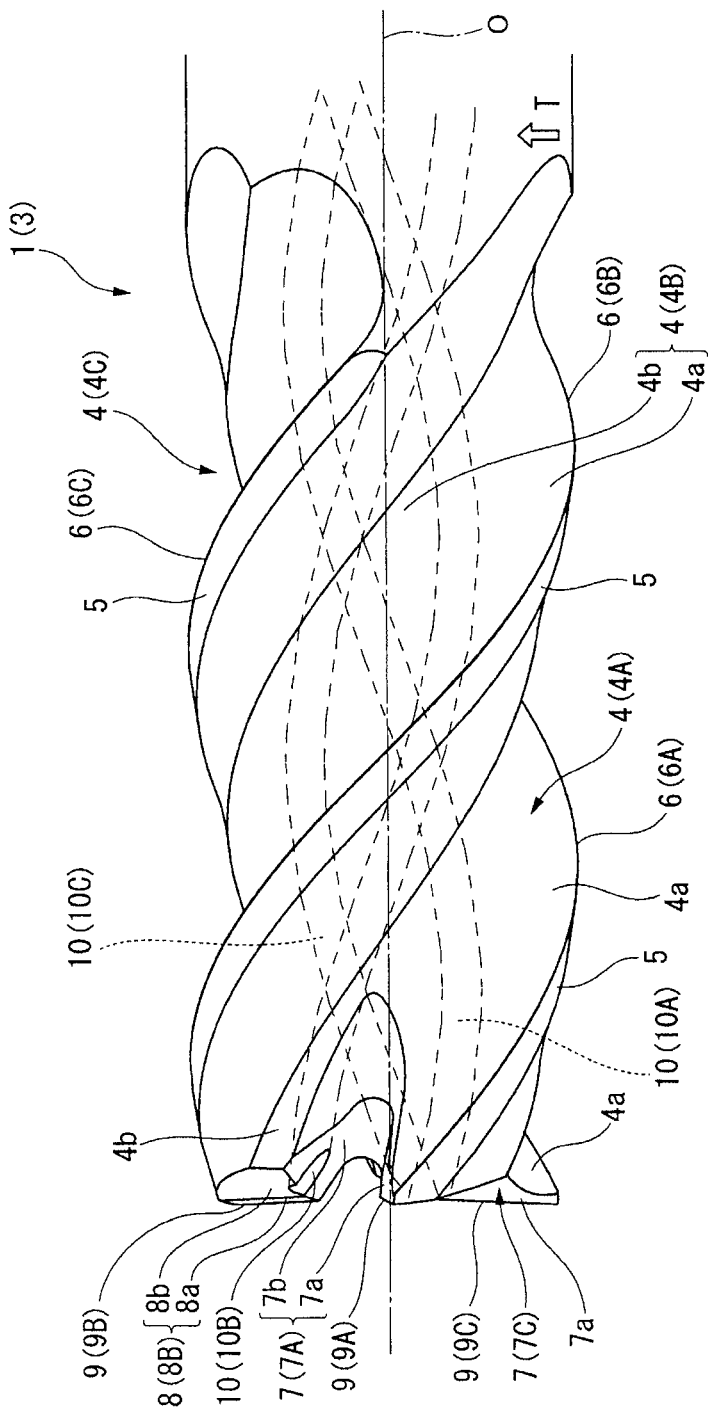
FIG. 4 is an enlarged plan view as seen in the direction of arrow Y in FIG. 2 of the cutting blade part of the embodiment illustrated in FIG. 1.

Additionally, a gash 7 having a recessed groove shape is formed at a tip portion of each chip discharge groove 4 in such a manner that the wall face 4a of each chip discharge groove 4 that faces the rotational direction T of the end mill is cut out toward an inner peripheral side of the end mill body 1. The gash 7 is formed in a V-shape that becomes gradually wider toward the tip side as illustrated in FIG. 3 or 4 as seen from the outer peripheral side of the end mill body 1, and has a wall face 7a that faces the rotational direction T of the end mill, and a wall face 7b that faces the backward side in the rotational direction T of the end mill. Therefore, in the present embodiment, the first to third gashes 7A to 7C are also respectively formed in order toward the rotational direction T of the end mill, at tip portions of the first to third chip discharge grooves 4A to 4C.

Also, bottom blades 9, which are connected to the tips of the peripheral blades 6 and extend toward the inner peripheral side of the end mill body 1, are respectively formed at intersecting ridgeline portions between the respective wall faces 7a of the gashes 7 that face the rotational direction T of the end mill and tip flank faces 8 formed by a tip surface of the cutting blade part 3 being cut out by the chip discharge grooves 4 and the gashes 7. In addition, in the present embodiment, the tip flank face 8 is formed by a first flank face 8a that intersects the bottom blade 9 and has a smaller flank angle and a second flank face 8b connected to a backward side of the first flank face 8a in the rotational direction T of the end mill and has a larger flank angle.

Here, three first to third tip flank faces 8A to 8C are formed by the three first to third chip discharge grooves 4A to 4C and the gashes 7A to 7C, at the tip surface of the cutting blade part 3. Also, in order toward the rotational direction T of the end mill, a first bottom blade 9A is formed at an intersecting ridgeline portion between the wall face 7a of the first gash 7A and the first tip flank face 8A, a second bottom blade 9B is formed at an intersecting ridgeline portion between the wall face 7a of the second gash 7B and the second tip flank face 8B, and a third bottom blade 9C is formed at an intersecting ridgeline portion between the wall face 7a of the third gash 7C and the third tip flank face 8C.

The first to third bottom blades 9A to 9C are located on one plane on which the rotation tracks around the axis O are orthogonal to the axis O or on one concave conical surface that is extremely slightly to the rear end side in the direction of the axis O toward the inner peripheral side, and the end mill of the present embodiment is formed as a square end mill in which the bottom blades 9 are orthogonal to the peripheral blades 6 or intersect the peripheral blades 6 at a slightly acute angle, in the rotation tracks. Additionally, in a tip view in the direction of the axis O, each bottom blade 9 extends linearly, and has a so-called arrangement-above-center so as to be located slightly closer to a forward side in the rotational direction T of the end mill than a straight line that is parallel to the bottom blade 9 and passes through the axis O.

Figure 2:
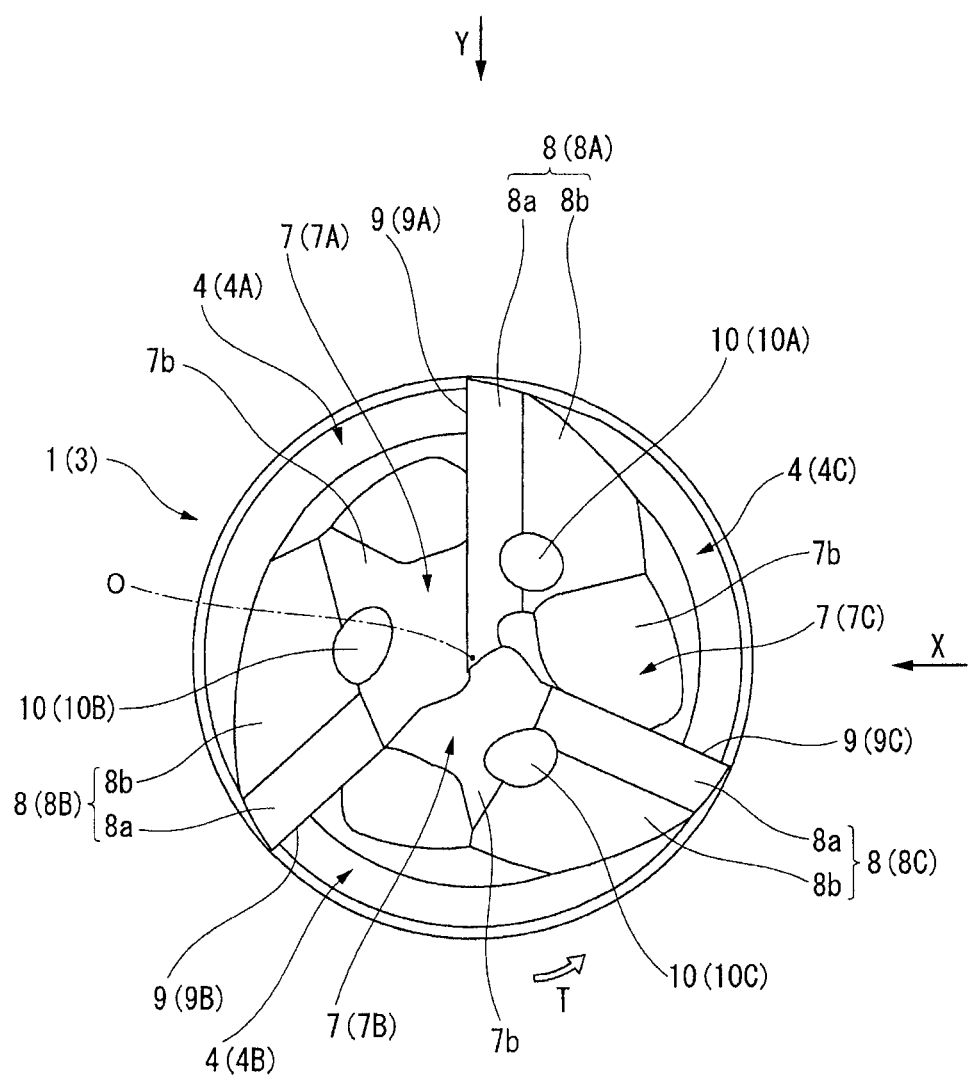
FIG. 2 is an enlarged front view of the embodiment illustrated in FIG. 1.

The first bottom blade 9A among the first to third bottom blades 9A to 9C serves as a long bottom blade that extends to the inner peripheral side of the end mill body 1 longer than the other second and third bottom blades 9B and 9C. The first bottom blade 9A serving as the long bottom blade, as illustrated in FIG. 2 as seen in the tip view in the direction of the axis O, extends up to a position that exceeds the axis O, in a radial direction of the end mill body 1 from the tip of the peripheral blade 6A.

Additionally, the second bottom blade 9B adjacent to the forward side of the first bottom blade 9A in the rotational direction T of the end mill serves as a short bottom blade that is shortest among the first to third bottom blades 9A to 9C. Moreover, the third bottom blade 9C adjacent to the forward side of the second bottom blade 9B in the rotational direction T of the end mill, that is, the backward side of the first bottom blade 9A in the rotational direction T of the end mill serves as a middle bottom blade having a middle length between the first and second bottom blades 9A and 9B serving as the short and long bottom blades.

Such the first to third bottom blades 9A to 9C are formed so as to be long and short by making the first to third gashes 7A to 7C have different sizes. The first gash 7A along which the first bottom blade 9A is formed at the intersecting ridgeline portion between the wall face 7a and the first tip flank face 8A is formed so that an inner peripheral portion of the second tip flank face 8B adjacent to the forward side of the first gash 7A in the rotational direction T of the end mill is largely cut out and communicates with the second gash 7B.

Additionally, the second gash 7B along which the second bottom blade 9B is formed at the intersecting ridgeline portion between the wall face 7a and the second tip flank face 8B is formed so that an inner peripheral portion of the third tip flank face 8C adjacent to the forward side of the second gash 7B in the rotational direction T of the end mill is largely cut out and communicates with the third gash 7C, a size with which the second gash 7B cuts out the third tip flank face 8C is made smaller than a size with which the first gash 7A cuts out the second tip flank face 8B.

With respect to the first and second gashes 7A and 7B, the third gash 7C along which the third bottom blade 9C is formed at the intersecting ridgeline portion between the wall face 7a and the third tip flank face 8C does not cut out the first tip flank face 8A adjacent to the forward side of the third gash 7C in the rotational direction T of the end mill until the first tip flank face 8A communicates with the first gash 7A, but is left on the inner peripheral side until the first tip flank face 8A exceeds the axis O in the tip view in the direction of the axis O between the first and third gashes 7A and 7C. Therefore, the first to third bottom blades 9A to 9C serve as long, middle, and short blades, respectively.

Meanwhile, three of the coolant holes 10 which is a number equal to that of the chip discharge grooves 4, the peripheral blades 6, or the bottom blades 9 extend toward the tip side from a rear end surface of the shank part 2, that is, a rear end surface of the end mill body 1, within the end mill body 1. The coolant holes 10 are formed so as to be twisted to the backward side in the rotational direction T of the end mill toward the rear end side in the direction of the axis O, similar to the chip discharge grooves 4 or the peripheral blades 6, and are made open to the tip of the cutting blade part 3, that is, the tip of the end mill body 1 between the chip discharge grooves 4 adjacent to each other in the circumferential direction in the cutting blade part 3.

Also, among the coolant holes 10, a first coolant hole 10A, which passes through a portion between the first chip discharge groove 4A connected to the first gash 7A along which the first bottom blade 9A serving as the long bottom blade is formed, and the third chip discharge groove 4C adjacent to the backward side of the first chip discharge groove 4A in the rotational direction T of the end mill, is made open to the first tip flank face 8A connected to the backward side the first bottom blade 9A serving as the long bottom blade in the rotational direction T of the end mill. In addition, the respective coolant holes 10 are formed in a circular shape having an equal internal diameter in a cross-section orthogonal to the axis O.

Additionally, a second coolant hole 10B, which passes through a portion between the first chip discharge groove 4A connected to the first gash 7A along which the first bottom blade 9A serving as the long bottom blade is formed, and the second chip discharge groove 4B adjacent to the forward side of the first chip discharge groove 4A in the rotational direction T of the end mill, is made open to the first gash 7A along which the first bottom blade 9A serving as the long bottom blade is formed. In addition, the third coolant hole 10C, which passes through a portion between the second and third chip discharge grooves 4B and 4C, is made open to the third tip flank face 8C connected to the third bottom blade 9C serving as the middle bottom blade.

Among the coolant holes 10A, the first coolant hole 10A is made open to the first tip flank face 8A in its entirety, and in the present embodiment, the first coolant hole 10A is made open to an intersecting ridgeline between the first and second flank faces 8a and 8b of the first tip flank face 8A. Additionally, although the second coolant hole 10B may be made open to the first gash 7A in its entirety, a portion of the second coolant hole 10B is made open astride the second tip flank face 8B in the present embodiment.

That is, the second coolant hole 10B is made open to an intersecting ridgeline between the second tip flank face 8B and the wall face 7b that faces the backward side of the first gash 7A in the rotational direction T of the end mill. However, as illustrated in FIG. 2 in the tip view in the direction of the axis O, the opening area of the second coolant hole 10B in the first gash 7A is made larger than the opening area of the second coolant hole 10B in the second tip flank face 8B.

Moreover, although the third coolant hole 100 may also be made open to the third tip flank face 8C in its entirety, the third coolant hole 100 is made open so that a portion thereof is located astride the second gash 7B in the present embodiment. However, as the tip view in the direction of the axis O is illustrated in FIG. 2, the opening area of the third coolant hole 100 in the third tip flank face 8C is made larger than the opening area of the third coolant hole 100 in the second gash 7B.

In addition, in the present embodiment, as illustrated in FIG. 2, the second coolant hole 10B is made open on the intersecting ridgeline between the wall face 7b of the first gash 7A that faces the backward side in the rotational direction T of the end mill, and the second flank face 8b of the second tip flank face 8B. However, a portion of the second coolant hole 10B may be made open astride the first flank face 8a of the second tip flank face 8B. Additionally, in the present embodiment, the third coolant hole 10C is made open on an intersecting ridgeline between the first and second flank faces 8a and 8b in the third tip flank face 8C.

Furthermore, as for the intervals between the respective bottom blades 9 and the respective coolant holes 10 adjacent to the backward sides of the bottom blades 9 in the rotational direction T of the end mill, in the present embodiment, the interval between the first bottom blade 9A serving as the long bottom blade and the first coolant hole 10A is the smallest, and the interval between the second bottom blade 9B serving as the short bottom blade and the second coolant hole 10B is the largest. Additionally, the interval between the third bottom blade 9C serving as the middle bottom blade and the third coolant hole 10C has a middle size therebetween. In addition, the interval between the bottom blade 9 and each coolant hole 10 adjacent to the backward side of the bottom blade 9 in the rotational direction T of the end mill is made to be a shortest interval between an extension line to each bottom blade 9 or the inner peripheral side of the end mill body 1, and an opening edge of each coolant hole 10, for example in the tip view in the direction of the axis O.

Meanwhile, in the present embodiment, as for the leads of the peripheral blades 6 and the coolant holes 10 that are twisted in the same direction as each other, the lead of the first coolant hole 10A that is made open to the first tip flank face 8A connected to the backward side of the first bottom blade 9A serving as the long bottom blade in the rotational direction T of the end mill, and the lead of the first peripheral blade 6A connected to the first bottom blade 9A are made equal to each other. In contrast, the lead of the second coolant hole 10B that is made open to the first gash 7A along which the first bottom blade 9A serving as the long bottom blade is formed is made larger than the lead of the second peripheral blade 6B connected to the second bottom blade 9B adjacent to the forward side of the first bottom blade 9A in the rotational direction T of the end mill.

Here, in the present embodiment, the lead of the first coolant hole 10A that is made open to the first tip flank face 8A connected to the backward side of the first bottom blade 9A serving as the long bottom blade in the rotational direction T of the end mill, and the lead of the second coolant hole 10B that is made open to the first gash 7A along which the first bottom blade 9A is formed are made equal to each other. Also, the lead of the second coolant hole 10B is made larger than the lead of the second peripheral blade 6B as described above by making the lead of the first peripheral blade 6A connected to the first bottom blade 9A serving as the long bottom blade larger than the lead of the second peripheral blade 6B connected to the second bottom blade 9B serving as the short bottom blade adjacent to the forward side of the first bottom blade 9A in the rotational direction T of the end mill.

Figure 5:
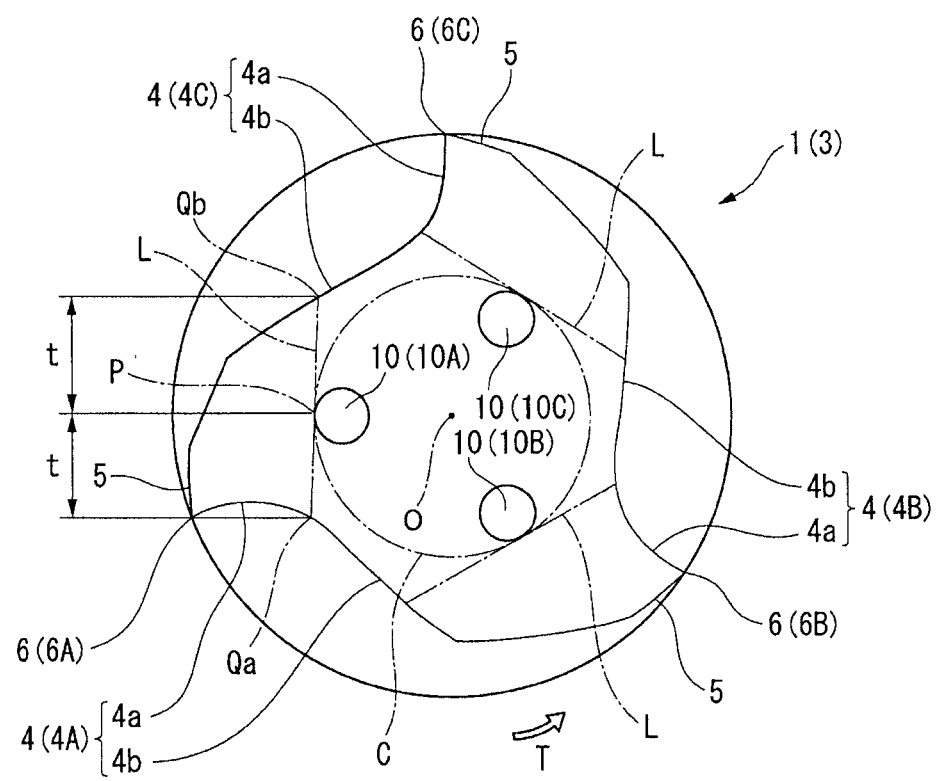
FIG. 5 is an enlarged cross-sectional view taken along line ZZ in FIG. 3.

In detail, in the present embodiment, the three first to third coolant holes 10A to 10C have leads equal to each other, and are formed at equal intervals in the circumferential direction on one cylindrical surface centered on the axis O of the end mill body 1. Moreover, the first to third peripheral blades 6A to 6C and the chip discharge grooves 4A to 4C are also formed at equal intervals in the circumferential direction as illustrated in FIG. 5, at positions on the rear end side of the cutting blade part 3 where, for example, the chip discharge grooves 4 begin to be cut upward to the outer peripheral side or at rear ends of the portions of the peripheral blades 6 with effective cutting blade lengths.

Also, the lead of the first peripheral blade 6A is made equal to the lead of the first coolant hole 10A, whereas the lead of the second peripheral blade 6B is made smaller than the lead of the first peripheral blade 6A and the leads of the coolant holes 10. That is, the lead of the second coolant hole 10B is made larger than the lead of the second peripheral blade 6B.

In addition, the lead of the third peripheral blade 6C is made smaller than the lead of the third coolant hole 10C, within a range smaller than the difference between the lead of the second coolant hole 10B and a lead of the second peripheral blade 6B, that is, the lead of the third coolant hole 10C is also made larger than the lead of the third peripheral blade 6C. Therefore, in the present embodiment, the leads of the first to third peripheral blades 6A to 6C are made to have mutually different sizes, the leads become smaller in order of the first, the third, and the second peripheral blades 6A, 6C, and 6B, and twist angles become larger in an order reversed to this.

Additionally, as the leads of the first to third peripheral blades 6A to 6C are made to have different sizes as well as the first to third peripheral blades 6A to 6C and the chip discharge grooves 4A to 4C are formed at equal intervals in the circumferential direction on the rear end side of the cutting blade part 3 as described above, the interval between the first peripheral blade 6A and the second peripheral blade 6B adjacent to the forward side of the first peripheral blade 6 in the rotational direction T of the end mill becomes gradually larger toward the tip side of the end mill body 1.

Therefore, the interval in the circumferential direction between the first bottom blade 9A serving as the long bottom blade and the second bottom blade 9B serving as the short bottom blade adjacent to the forward side of the first bottom blade 9A in the rotational direction T of the end mill also becomes larger, and is made larger than the interval between the other bottom blades 9 in the present embodiment. In addition, in the present embodiment, the interval between the third bottom blade 9C serving as the middle bottom blade and the first bottom blade 9A serving as the long bottom blade adjacent to the forward side of the third bottom blade 9C in the rotational direction T of the end mill is next largest, and the interval between the second bottom blade 9B serving as the short bottom blade and the third bottom blade 9C serving as the middle bottom blade adjacent to the forward side of the second bottom blade 9B in the rotational direction T of the end mill is made the smallest.

Additionally, on the rear end side of the cutting blade part 3, each coolant hole 10 is formed so that a substantially equal thickness t is secured for the wall face 4a that faces the rotational direction T of the end mill in the chip discharge groove 4 formed on the forward side of each coolant hole 10 in the rotational direction T of the end mill and the wall face 4b that faces the backward side in the rotational direction T of the end mill in the chip discharge groove 4 formed on the backward side of each coolant hole 10 in the rotational direction T of the end mill, in a cross-section orthogonal to the axis O of the end mill body 1 as illustrated in FIG. 5.

Here, when a circle C that touches each coolant hole 10 from the outer peripheral side of the end mill body 1 is drawn, for example in the cross-section orthogonal to the axis O as illustrated in FIG. 5, the thickness t is, the interval between an intersection point Qa between a tangential line L and the wall face 4a, and a contact point P, and the interval between an intersection point Qb between the tangential line L and the wall face 4b, and the contact point P, on the common tangential line L at the contact point P of the circle C and a circle formed by the coolant hole 10. Additionally, as for the substantially equal thickness t, a middle point between the intersection points Qa and Qb, for example in the above cross-section may be located within a range of the circle formed by the coolant hole 10 in the direction of the tangential line L.

In the end mill with coolant holes configured in this way, the first bottom blade 9A serves as the long bottom blade that extended to the inner peripheral side longer than the other second and third bottom blades 9B and 9C, and the cutting blade length thereof is long. Additionally, in the present embodiment, particularly the interval in the circumferential direction between the first bottom blade 9A and the second bottom blade 9B adjacent to the forward side of the first bottom blade 9A in the rotational direction T of the end mill is also made large. Therefore, the load of the first bottom blade 9A during cutting is large, and the amount of produced chips is more than that of the other bottom blades 9B and 9C. However, since the first coolant hole 10A formed adjacent to the backward side of the first bottom blade 9A in the rotational direction T of the end mill is made open to the first tip flank face 8A connected to the first bottom blade 9A, coolant can sufficiently be spread over the first tip flank face 8A, effective cooling or lubrication can be achieved, and flank face wear of the first tip flank face 8A can be minimized.

Particularly, in the present embodiment, the interval between the first bottom blade 9A and the first coolant hole 10A in the first tip flank face 8A is made smaller than the interval between the second bottom blade 9B and the second coolant hole 10B and the interval between the third bottom blade 9C and the third coolant hole 100, that is, is made to be the smallest interval, and the first coolant hole 10A is made open to a position closer to the first bottom blade 9A. Therefore, the first bottom blade 9A that has a high temperature during cutting is efficiently cooled, the first flank face 8a with a small flank angle is also reliably lubricated. Thus, it is possible to provide an end mill with coolant holes that suppresses damage to the first bottom blade 9A caused by the flank face wear of the first tip flank face 8A and has long service life.

Additionally, the second coolant hole 10B, which passes the portion between the first chip discharge groove 4A connected to the first gash 7A along which the first bottom blade 9A is formed, and the second chip discharge groove 4B adjacent to the forward side of the first chip discharge groove 4A in the rotational direction T of the end mill, is made open to the first gash 7A. Therefore, the coolant supplied from the second coolant hole 10B enables a large amount of chips produced by the first bottom blade 9A to be reliably and smoothly discharged via the first chip discharge groove 4A from the first gash 7A, and can prevent chip clogging, biting of chips, or the like so as to perform stable cutting. Particularly, even when many chips are produced by the first bottom blade 9A during longitudinal feed processing or ramping processing, excellent chip discharge performance can be obtained.

Moreover, in the present embodiment, the second coolant hole 10B is made open so that a portion thereof is also located astride the second tip flank face 8B. However, in the tip view in the direction of the axis O, the opening area of the second coolant hole 10B in the first gash 7A is made larger than the opening area of the second coolant hole 10B in the second tip flank face 8B. For this reason, most of the coolant, which is supplied from the second coolant hole 10B, can be supplied to the first gash 7A so as to more reliably discharge a large amount of chips produced by the first bottom blade 9A from the first chip discharge groove 4A.

Meanwhile, in the present embodiment, the first coolant hole 10A is made open to a position close to the first bottom blade 9A in the first tip flank face 8A as described above. However, the first bottom blade 9A is formed at the intersecting ridgeline portion between the wall face 7a of the first gash 7A obtained by cutting out the tip portion of the first chip discharge groove 4A, and the first tip flank face 8A. Thus, the first coolant hole 10A can be formed at a middle position in the circumferential direction between the wall face 4a of the first chip discharge groove 4A and the wall face 4b of the third chip discharge groove 4C, in a portion where the first gash 7A is not formed even at the tip portion of the first chip discharge groove 4A.

Also, in the present embodiment, the lead of the first coolant hole 10A is made equal to the lead of the first peripheral blade 6A connected to the first bottom blade 9A. Thus, the state where the first coolant hole 10A is located at the middle position between the wall face 4a of the first chip discharge groove 4A and the wall face 4b of the third chip discharge groove 4C in this way over the rear end side of the cutting blade part 3 can be maintained. That is, since the first coolant hole 10A can be formed so as to reach the rear end side of the cutting blade part 3, with the substantially equal thickness t being secured between the first coolant hole 10A and the first wall faces 4a and 4b as described above, the strength of the end mill body 1 on the rear end side of the cutting blade part 3 on which a largest bending moment acts in the cutting blade part 3 when a cutting load is generated in the bottom blade 9, can be secured.

However, as in the second coolant hole 10B, when the second coolant hole 10B is made open to the first gash 7A and interval thereof from the second bottom blade 9B is made large, that is, when the second coolant hole 10B is made open to a position close to the wall face 4b of the first chip discharge groove 4A that faces the backward side in the rotational direction T of the end mill, the second coolant hole 10B reaches the rear end side of the cutting blade part 3 while still being at the position close to the wall face 4b if the lead of the second coolant hole 10B is made equal to the lead of the second peripheral blade 6B connected to the second bottom blade 9B, similar to the first coolant hole 10A. For this reason, the thickness between the wall face 4b and the second coolant hole 10B becomes small, the strength of the end mill body 1 is impaired, and when the bending moment as described above acts on the rear end side of the cutting blade part 3, there is a concern that breakage may occur.

In contrast, in the present embodiment, the lead of the second coolant hole 10B that is made open to the first gash 7A along which the first bottom blade 9A serving as the long bottom blade is formed is made larger than the lead of the second peripheral blade 6B connected to the second bottom blade 9B adjacent to the forward side of the first bottom blade 9A in the rotational direction T of the end mill. Therefore, the second peripheral blade 6B approaches the wall face 4a, which faces the forward side of the rotational direction T of the end mill in the second chip discharge groove 4B along which the second coolant hole 10B is formed at the outer-peripheral-side ridge portion, toward the rear end side of the cutting blade part 3.

For this reason, on the rear end side of the cutting blade part 3, similar to the first coolant hole 10A, the above-described substantially equal thickness t can be secured between the second coolant hole 10B and the wall face 4a of the second chip discharge groove 4B and between the second coolant hole 10B and the wall face 4b of the first chip discharge groove 4A that faces the backward side in the rotational direction T of the end mill, and the strength reduction of the end mill body 1 can be prevented. The same applies to the third coolant hole 100. Therefore, in the present embodiment, as illustrated in FIG. 5, in all three coolant holes 10, the substantially equal thickness t can be secured for the wall faces 4a and 4b, and it is possible to prevent breakage of the end mill body 1 to further extend service life.

Moreover, in the present embodiment, when the lead of the second coolant hole 10B is made larger than the lead of the second peripheral blade 6B in this way, the lead of the second coolant hole 10B is made equal to the lead of the first coolant hole 10A and the first peripheral blade 6A so as to make the lead of the first peripheral blade 6A larger than the lead of the second peripheral blade 6B, that is, so as to make the lead of the second peripheral blade 6B smaller than the lead of the first and second coolant holes 10A and 10B and the first peripheral blade 6A. Additionally, the lead of the third coolant hole 100 is made equal to the first and second coolant holes 10A and 10B and the first peripheral blade 6A, and the lead of the third peripheral blade 6C is made to have a middle value between the leads of the first and second peripheral blades 6A and 6B.

That is, the first and second peripheral blades 6A and 6B have unequal leads, and particularly, all of the first to third peripheral blades 6A to 6C have unequal leads in the present embodiment. Thus, the magnitudes and directions of cutting loads when the peripheral blades 6 cut a workpiece material are different from each other, and the vibrations of the end mill body 1 caused by the cutting loads can cancel each other out. Therefore, as such vibration acts periodically, chattering vibration can be prevented from occurring in the end mill body during cutting, and degradation of processing precision or damage to the end mill body 1 by this chattering vibration can be prevented.

Additionally, in the present embodiment, the first to third peripheral blade 6A to 6C are made to have unequal leads as well as being formed at regular intervals in the circumferential direction on the rear end side of the cutting blade part 3 as described above. Therefore, the intervals in the circumferential direction between the first to third bottom blades 9A to 9C connected to the tips of the first to third peripheral blades 6A to 6C are also different from each other. Therefore, the vibrations caused by the cutting loads that act on the first to third bottom blades 9A to 9C also cancel each other out, and it is thus possible to more reliably prevent generation of chattering vibration. However, if the first to third peripheral blades 6A to 6C with the unequal leads are formed at regular intervals on the rear end side of the cutting blade part 3 in this way, there is a concern that extreme broadness and narrowness occurs for the intervals between the first to third peripheral blades 6A to 6C or for the intervals between the first to third bottom blades 9A to 9C, at the tip of the cutting blade part 3. In such a case, the first to third peripheral blades 6A to 6C may be formed so as to have regular intervals in the circumferential direction, for example at central portions of the portions of the peripheral blade 6 with the effective cutting blade lengths.

In addition, in the present embodiment, the second bottom blade 9B serves as the short bottom blade and the third bottom blade 9C serves as the middle bottom blade. Contrary to this, however, the second bottom blade 9B may serve as the middle bottom blade, and the third bottom blade 9C may serve as the short bottom blade. Additionally, the second and third bottom blades 9B and 9C may be made to have lengths that are equal to each other. Moreover, in the present embodiment, a case where the invention is applied to a square end mill in which the peripheral blade 6 and the bottom blade 9 are orthogonal to each other or intersect each other at a slightly acute angle on a rotation track has been described. However, the invention can also be applied to a radius end mill in which a peripheral blade and a bottom blade are connected together via a corner blade in a convexly curved shape, such as a ¼ arc, or a ball end mill in which a bottom blade itself is formed in a convexly curved shape, such as a ¼ arc, on a rotation track depending on circumstances.

Additionally, in the present embodiment, a case where the invention is applied to a three-bladed end mill has been described. However, if a plurality of chip discharge grooves, a plurality of peripheral blades, a plurality of gashes, a plurality of bottom blades, or the like are provided, it is also possible to apply the invention to a two-bladed end mill or an end mill having four or more blades. For example, if a four-bladed end mill is provided, long bottom blades and short bottom blades may be alternately formed as in the end mill described in Japanese Patent No. 4409665. However, if the balance of the strength or the like of the cutting blade part 3 cut out by the chip discharge grooves 4, the gashes 7, the coolant holes 10, and the like is taken into consideration, it is suitable to apply the invention to the three-bladed end mill as in the present embodiment.

INDUSTRIAL APPLICABILITY

Even in the end mill in which the cutting blade part of the tip of the end mill body is formed with the long bottom blade extending to the inner peripheral side of the end mill body longer than the other bottom blades, it is possible to smoothly discharge chips produced by the long bottom blade during longitudinal feed processing or ramping processing while effectively minimizing the flank face wear of the long bottom blade.

The invention claimed is:
1. An end mill with coolant holes, comprising:
a tip portion configured to rotate around an axis and to serve as a cutting blade part;
a plurality of chip discharge grooves that are twisted to a backward side in a rotational direction of the end mill toward a rear end side in a direction of the axis and are formed at predetermined intervals in a circumferential direction at an outer periphery of the cutting blade part,
peripheral blades that are respectively formed at outer-peripheral-side ridge portions of wall faces of the chip discharge grooves facing the rotational direction of the end mill;
gashes that are formed at tip portions of the chip discharge grooves; and
bottom blades extending from tips of the peripheral blades toward the axis, said bottom blades being formed at intersecting ridgeline portions between wall faces of the gashes that face the rotational direction of the end mill and tip flank faces of the end mill body,
wherein at least one bottom blade among the bottom blades serves as a long bottom blade that is longer than the bottom blade adjacently provided at a forward side in the rotational direction of the end mill and the bottom blade adjacently provided at a backward side in the rotational direction of the end mill,
wherein each of the coolant holes is formed between the chip discharge grooves, which are adjacent to each other in the circumferential direction of the end mill body,
wherein a first coolant hole passes through a portion between a chip discharge groove connected to a gash along which the long bottom blade is formed and another chip discharge groove adjacently provided at a backward side of the chip discharge groove in the rotational direction of the end mill, said first coolant hole being open to a tip flank face connected to a backward side of the long bottom blade in the rotational direction of the end mill, and
wherein a second coolant hole passes through a portion between the chip discharge groove connected to the gash along which the long bottom blade is formed, and second chip discharge groove adjacently provided at a forward side of the chip discharge groove in the rotational direction of the end mill, said second coolant hole being open to the gash along which the long bottom blade is formed.

2. The end mill with coolant holes according to claim 1, wherein,
in a top plan view in the direction of the axis, an interval between the first coolant hole that is open to the tip flank face connected to the backward side of the long bottom blade in the rotational direction of the end mill, and
the long bottom blade is smaller than an interval between the bottom blade adjacent to the second coolant hole that is open to the gash along which the long bottom blade is formed, and the bottom blade adjacent to the forward side of the bottom blade in the rotational direction of the end mill.

3. The end mill with coolant holes according to claim 1, wherein the second coolant hole that is open to the gash, along which the long bottom blade is formed, is provided on a border between said gash and the tip flank face of the bottom blade adjacently provide at the forward side of the long bottom blade in the rotational direction of the end mill, and
wherein, in a top plan view in the direction of the axis, an opening area in the gash along which the long bottom blade is formed is larger than an opening area in the tip flank face of the bottom blade adjacent to the forward side of the long bottom blade in the rotational direction of the end mill.

4. The end mill with coolant holes according to claim 1, wherein, a lead of the first coolant hole that is open to the tip flank face connected to the backward side of the long bottom blade in the rotational direction of the end mill, and a lead of a peripheral blade connected to the long bottom blade are equal to each other, and
wherein a lead of the second coolant hole that is open to the gash along which the long bottom blade is formed is larger than the lead of a peripheral blade connected to the bottom blade adjacent to the forward side of the long bottom blade in the rotational direction of the end mill.

5. The end mill with coolant holes according to claim 4, wherein, the lead of the first coolant hole that is open to the tip flank face connected to the backward side of the long bottom blade in the rotational direction of the end mill, and the lead of the second coolant hole that is made open to the gash along which the long bottom blade is formed are equal to each other, and
wherein the lead of the peripheral blade connected to the long bottom blade is larger than the lead of the peripheral blade connected to the bottom blade adjacent to the forward side of the long bottom blade in the rotational direction of the end mill.

6. The end mill with coolant holes given according to claim 1,
wherein the cutting blade part comprises three chip discharge grooves, the three peripheral blades, the three gashes, and the three bottom blades.

7. The end mill with coolant holes according to claim 2, wherein the second coolant hole that is open to the gash, along which the long bottom blade is formed, is provided on a border between said gash and the tip flank face of the bottom blade adjacent to the forward side of the long bottom blade in the rotational direction of the end mill, and
wherein, in a top plan view in the direction of the axis, an opening area in the gash along which the long bottom blade is formed is larger than an opening area in the tip flank face of the bottom blade adjacent to the forward side of the long bottom blade in the rotational direction of the end mill.

8. The end mill with coolant holes according to claim 2, wherein, a lead of the first coolant hole that is open to the tip flank face connected to the backward side of the long bottom blade in the rotational direction of the end mill, and a lead of a peripheral blade connected to the long bottom blade are equal to each other, and wherein a lead of the second coolant hole that is open to the gash along which the long bottom blade is formed is larger than the lead of a peripheral blade connected to the bottom blade adjacent to the forward side of the long bottom blade in the rotational direction of the end mill.

9. The end mill with coolant holes according to claim 3, wherein, a lead of the first coolant hole that is open to the tip flank face connected to the backward side of the long bottom blade in the rotational direction of the end mill, and a lead of a peripheral blade connected to the long bottom blade are equal to each other, and wherein a lead of the second coolant hole that is open to the gash along which the long bottom blade is formed is larger than the lead of a peripheral blade connected to the bottom blade adjacent to the forward side of the long bottom blade in the rotational direction of the end mill.

10. The end mill with coolant holes given according to claim 2,
    wherein the cutting blade part comprises three chip discharge grooves, the three peripheral blades, the three gashes, and the three bottom blades.

11. The end mill with coolant holes given according to claim 3,
    wherein the cutting blade part comprises three chip discharge grooves, the three peripheral blades, the three gashes, and the three bottom blades.

12. The end mill with coolant holes given according to claim 4,
    wherein the cutting blade part comprises three chip discharge grooves, the three peripheral blades, the three gashes, and the three bottom blades.

13. The end mill with coolant holes given according to claim 5,
    wherein the cutting blade part comprises three chip discharge grooves, the three peripheral blades, the three gashes, and the three bottom blades.

* * * * *